United States Patent
Kim

(10) Patent No.: US 9,864,360 B2
(45) Date of Patent: Jan. 9, 2018

(54) POSITION ALIGNING APPARATUS OF VEHICLE AND INSPECTION METHOD USING THE SAME

(71) Applicants: Hyundai Motor Company, Seoul (KR); Kia Motors Corporation, Seoul (KR)

(72) Inventor: Dongmyong Kim, Gyeonggi-Do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 436 days.

(21) Appl. No.: 14/560,434

(22) Filed: Dec. 4, 2014

(65) Prior Publication Data

US 2016/0025597 A1    Jan. 28, 2016

(30) Foreign Application Priority Data

Jul. 28, 2014 (KR) .......................... 10-2014-0095817

(51) Int. Cl.
*G01M 17/007* (2006.01)
*G05B 19/402* (2006.01)

(52) U.S. Cl.
CPC ....... *G05B 19/402* (2013.01); *G01M 17/0074* (2013.01); *G05B 2219/41091* (2013.01)

(58) Field of Classification Search
CPC .................................. E04H 6/00; B60S 13/00
See application file for complete search history.

(56) References Cited

U.S. PATENT DOCUMENTS

| 5,461,564 A * | 10/1995 | Collins | B60G 17/01933 |
| | | | 280/5.514 |
| 2007/0128009 A1* | 6/2007 | Lee | E04H 6/186 |
| | | | 414/253 |
| 2011/0280700 A1* | 11/2011 | Uttech | A61G 7/1019 |
| | | | 414/540 |
| 2012/0029762 A1* | 2/2012 | Ubik | G07C 5/008 |
| | | | 701/29.6 |

FOREIGN PATENT DOCUMENTS

| JP | 09-020273 A | 1/1997 |
| JP | 2006-293762 A | 10/2006 |

* cited by examiner

*Primary Examiner* — Thomas Lee
*Assistant Examiner* — Vincent Chang
(74) *Attorney, Agent, or Firm* — Mintz Levin Cohn Ferris Glovsky and Popeo, P.C.; Peter F. Corless

(57) ABSTRACT

A position aligning apparatus of a vehicle installed at a bottom surface of a vehicle inspection line to respectively correspond to both sides of a front wheel and both sides of a rear wheel of the vehicle so as to target-position the vehicle at an inspection position includes: a front aligning unit regulating a front movement of the vehicle having entered into the vehicle inspection line and aligning a front right/left position of the vehicle while pressing a front wheel of the vehicle in a right/left direction according to operation of a first actuator; a rear aligning unit aligning a rear right/left position of the vehicle while pressing a rear wheel of the vehicle in the right/left direction according to operation of a second actuator; and a controller controlling the operation of the first and second actuators.

13 Claims, 8 Drawing Sheets

POSITION ALIGNING APPARATUS OF VEHICLE AND INSPECTION METHOD USING THE SAME

CROSS-REFERENCE TO RELATED APPLICATION

This application claims under 35 U.S.C. §119 (a) priority to and the benefit of Korean Patent Application No. 10-2014-0095817 filed in the Korean Intellectual Property Office on Jul. 28, 2014, the entire contents of which are incorporated herein by reference.

BACKGROUND (a) Field of the Invention

The present invention relates to a position aligning apparatus of a vehicle, and an inspection method using the same. More particularly, the present invention relates to a position aligning apparatus of a vehicle aligning an inspection vehicle entering a vehicle inspection line at a home position for inspection, and an inspection method using the same.

(b) Description of the Related Art

In general, during a manufacturing process of a vehicle, various structural parts such as a vehicle body panel molded by a press and the like are bonded by a method such as welding to complete an integrated vehicle body, and the completed vehicle body is painted and rust-proofed throughout the surface of each part in a painting process.

Next, a design process is performed, such as assembling a part of a power train system and parts such as suspension, steering, and braking systems, and subsequently, a door, a trunk lid, a hood, and the like are assembled.

The vehicle completed through the manufacturing process is moved into the vehicle inspection line for various inspections, and the inspection of the completed vehicle is performed by using various inspection equipment installed on the vehicle inspection line.

Particularly, the door, the trunk lid, the hood, and the like assembled through the design process are main elements determining an appearance of the completed vehicle, and importance of inspection thereof is gradually increased.

The inspection of the completed vehicle includes inspecting an assembly state, a facade, and a stepped gap of the assembled parts by using various equipment after moving the vehicle into the vehicle inspection position on the vehicle inspection line, that is, the target position, through direct operation of a worker.

However, if the position of the vehicle moved into the vehicle inspection line is not aligned and fixed at the set correct position with the various equipment when processing the inspection of the vehicle, the equipment for the inspection may malfunction, and the reliability of the inspection is deteriorated.

Accordingly, the worker performs the inspection work while repeatedly moving the vehicle to position the vehicle at the target position.

To address the above problem, a position aligning apparatus of the vehicle has been installed on the vehicle inspection line to align and fix the vehicle moved to the vehicle inspection line at the target position.

According to the position aligning apparatus of the vehicle, work of digging below the vehicle inspection line to a predetermined depth is essentially performed, and the various parts are buried and installed at the dug portion.

However, when the conventional position aligning apparatus of the vehicle performs the work of digging the ground to bury the parts, excessive work time of about 14 days to 30 days is consumed.

Also, the installation position is limited, and once the position aligning apparatus is installed, demolition thereof is difficult, and the time and cost according to the demolition are excessive.

The above information disclosed in this Background section is only for enhancement of understanding of the background of the invention and therefore it may contain information that does not form the prior art that is already known in this country to a person of ordinary skill in the art.

SUMMARY

An exemplary embodiment of the present invention provides a position aligning apparatus of a vehicle to align the vehicle entering the vehicle inspection line at the target position for inspection and to regulate a movement thereof, and an inspection method using the same.

An exemplary embodiment of the present invention is directly installed at a bottom surface of a vehicle inspection line, thereby providing a position aligning apparatus of a vehicle while omitting the digging work performed for the installation in a conventional art, and an inspection method using the same.

The position aligning apparatus of the vehicle installed at a bottom surface of a vehicle inspection line to respectively correspond to both sides of a front wheel and both sides of a rear wheel of the vehicle having entered into the vehicle inspection line to target-position the vehicle at an inspection position according to an exemplary embodiment of the present invention includes: a front aligning unit regulating a front movement of the vehicle having entered into the vehicle inspection line and aligning a front right/left position of the vehicle to a predetermined position while pressing a front wheel of the vehicle in a right/left direction according to operation of a first actuator; a rear aligning unit aligning a rear right/left position of the vehicle to a predetermined position while pressing a rear wheel of the vehicle in the right/left direction according to operation of a second actuator; and a controller controlling the operation of the first and second actuators.

In the position aligning apparatus of the vehicle according to an exemplary embodiment of the present invention, the front aligning unit includes: a base frame installed at the bottom surface of the vehicle inspection line; a slide unit installed to be movable in the right/left direction of the vehicle on the base frame and connected to the first actuator to align the front right/left position of the vehicle while selectively pressing an outside and an inside of the front wheel of the vehicle; and a plurality of sliding members installed along a moving direction of the slide unit on the base frame and contacting the front wheel of the vehicle having entered the slide unit.

In the position aligning apparatus of the vehicle according to an exemplary embodiment of the present invention, the slide unit includes: a slider installed to be movable on the base frame, formed with an opening entered by the front wheel of the vehicle, and moving the outside and the inside of the front wheel according to the operation of the first actuator while selectively pressing one side and the other side of the opening; and a guide rail provided at the front/rear lower side of the slider and guided along a guide groove formed along the moving direction of the slider at the base frame.

In the position aligning apparatus of the vehicle according to an exemplary embodiment of the present invention, the sliding member may be made of a plurality of first free rollers installed on the base frame to be disposed at the opening of the slider and installed as a pair facing each other to contact the front wheel.

In the position aligning apparatus of the vehicle according to an exemplary embodiment of the present invention, a pair of first free rollers includes one side that is respectively declined toward a center of the opening.

In the position aligning apparatus of the vehicle according to an exemplary embodiment of the present invention, the first actuator is installed at one side of the slider on the base frame and is made of an electric cylinder having an operation rod connected to the slider through a connecting portion to move the slider to a right/left side.

In the position aligning apparatus of the vehicle according to an exemplary embodiment of the present invention, the rear aligning unit includes: a base frame installed at a bottom surface of the vehicle inspection line; a slide unit installed to be movable in the right/left direction of the vehicle on the base frame and connected to the second actuator to align the right/left position of the vehicle while selectively pressing the outside and the inside of the rear wheel of the vehicle; and a plurality of sliding members installed along the moving direction of the slide unit on the base frame and contacting the real wheel of the vehicle having entered the slide unit.

In the position aligning apparatus of the vehicle according to an exemplary embodiment of the present invention, the slide unit includes: a slider installed to be movable on the base frame, formed with an opening entered by the rear wheel of the vehicle, and moving the inside and the outside of the rear wheel according to the operation of the second actuator while selectively pressing one side and the other side of the opening; and a guide rail provided at the front/real lower side of the slider and guided along a guide groove formed along the moving direction of the slider at the base frame.

In the position aligning apparatus of the vehicle according to an exemplary embodiment of the present invention, the sliding member may be made of a plurality of second free rollers installed on the base frame to be disposed at the opening of the slider and installed as a pair facing each other to contact the rear wheel.

In the position aligning apparatus of the vehicle according to an exemplary embodiment of the present invention, the second actuator may be installed at one side of the slider on the base frame, and is made of an electric cylinder having an operation rod connected to the slider through a connecting portion to move the slider to a right/left side.

An inspection method of a vehicle according to an exemplary embodiment of the present invention includes: (a) entering an inspection vehicle into a vehicle inspection line; (b) connecting a vehicle information device to the vehicle and receiving vehicle information; (c) selecting an inspection program according to the information obtained from the information receiving process; (d) target-positioning the vehicle to an inspection position to perform the inspection according to the selected program; (e) inspecting the vehicle through the inspection program if the vehicle is positioned at the target position; (f) separating the vehicle information device if the inspection process is completed and relieving the operation of the position aligning apparatus of the vehicle; and (g) discharging the vehicle outside the vehicle inspection line.

In the process (d), a position aligning apparatus of the vehicle includes: a front aligning unit regulating a front movement of the vehicle having entered into the vehicle inspection line and aligning a front right/left position of the vehicle to a predetermined position while pressing a front wheel of the vehicle in a right/left direction according to operation of a first actuator; a rear aligning unit aligning a rear right/left position of the vehicle to a predetermined position while pressing a rear wheel of the vehicle in the right/left direction according to operation of a second actuator; and a controller controlling the operation of the first and second actuators.

In the process (d), the slider of the front aligning unit may align the right and left position of the vehicle while selectively pressing an outside or an inside of the front wheel of the vehicle.

In the process (d), the slider of the rear aligning unit may align the right and left position of the vehicle while selectively pressing the outside or the inside of the rear wheel of the vehicle.

An exemplary embodiment of the present invention aligns the vehicle having entered the vehicle inspection line to the target position for inspection, thereby correctly and seamlessly performing the movement of the vehicle and the inspection work thereof.

An exemplary embodiment of the present invention is directly installed at the bottom surface of the vehicle inspection line, thereby omitting the work of digging the ground in the conventional art and reducing the work time according to the installation of the goods.

In an exemplary embodiment of the present invention, by omitting the digging work, the installed position and space may be flexible, and the replacement and the withdrawal may be easily performed.

DETAILED DESCRIPTION OF THE EMBODIMENTS

Figure 1:
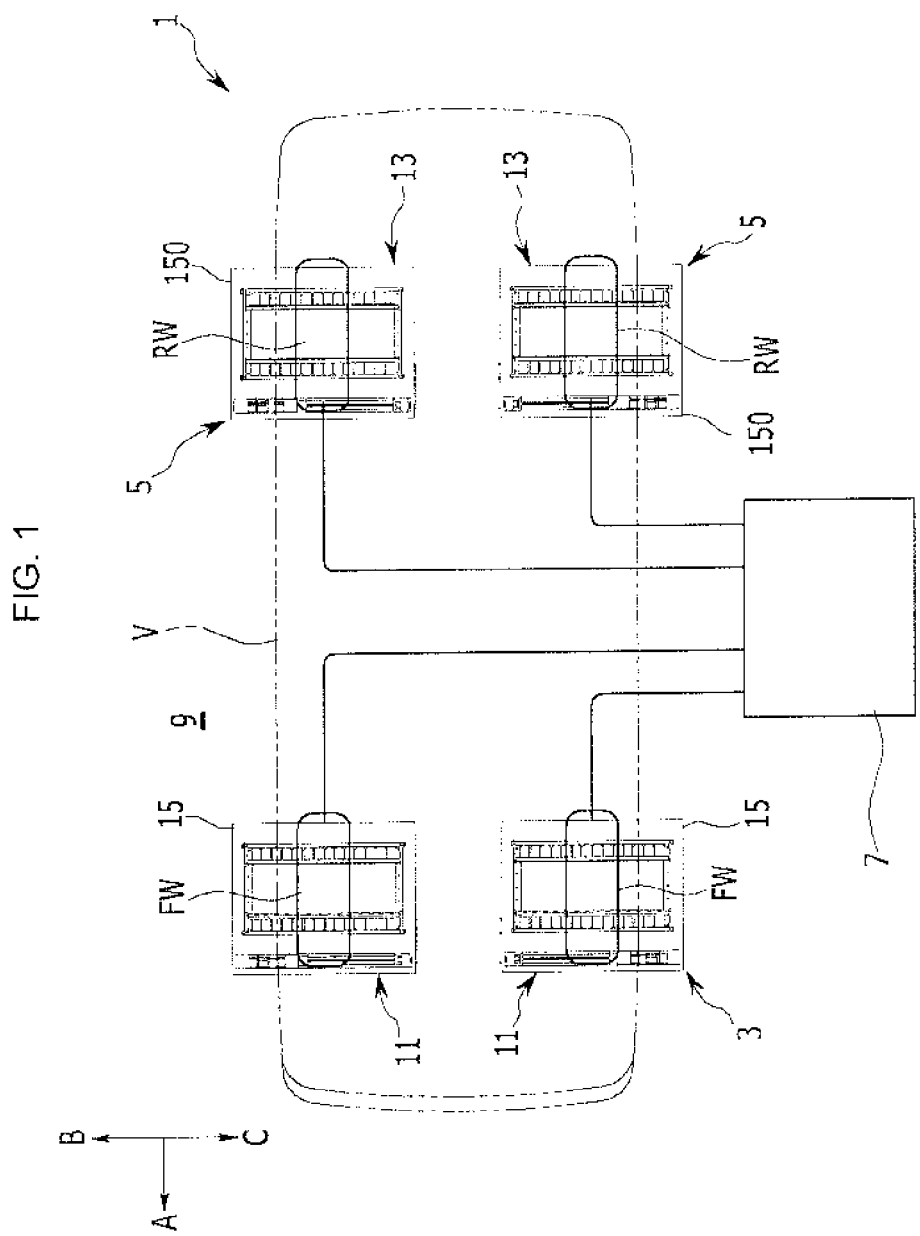
FIG. 1 is a schematic installation state view of a position aligning apparatus of a vehicle according to an exemplary embodiment of the present invention.

Hereinafter, exemplary embodiments of the present invention will be described in detail with reference to the accompanying drawings.

The size and thickness of each component illustrated in the drawings are arbitrarily shown for understanding and ease of description, but the present invention is not limited thereto. Thicknesses of several portions and regions are enlarged for clear expressions.

To clarify the present invention, portions irrespective of description are limited and, in the following description, terms such as "first" and "second," etc., may be used only to distinguish one component from another as pertinent components are named the same, and an order thereof is not limited.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Further, the control logic of the present invention may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

In describing embodiments of the present invention, for convenience of description, with reference to a vehicle of FIG. 1, an arrow of an A direction is defined as front, an arrow of a B direction is defined as left, and an arrow of a C direction is right.

A position aligning apparatus 1 according to an exemplary embodiment of the present invention is installed at a bottom surface of a vehicle inspection line to automatically align the vehicle V entering the vehicle inspection line at the target position for the inspection and to regulate movement thereof so as to smoothly and correctly perform inspection work.

The position aligning apparatus 1 of the vehicle according to an exemplary embodiment of the present invention includes a front aligning unit 3 installed at respective sides at front wheels FW of the vehicle V, and a rear aligning unit 5 installed at both sides at rear wheels RW, and the front and rear aligning units 3 and 5 may have the same elements and operation.

Accordingly, the position aligning apparatus 1 of the vehicle according to an exemplary embodiment of the present invention may be manufactured as the position aligning apparatus 1 for a vehicle to be independently installed to four positions corresponding to vehicle wheels FW and RW of the vehicle V of the vehicle inspection line regardless of the front aligning unit 3 and the rear aligning unit 5.

FIG. 1 is a schematic installation state view of a position aligning apparatus of a vehicle according to an exemplary embodiment of the present invention.

Referring to FIG. 1, the position aligning apparatus 1 of the vehicle according to an exemplary embodiment of the present invention includes the front aligning units 3, the rear aligning units 5, and a controller 7.

The front aligning unit 3 is respectively installed at a bottom surface of a vehicle inspection line 9 while corresponding to both front wheels FW of the vehicle V, thereby controlling a movement of the front A of the vehicle V entering into the vehicle inspection line 9.

The front aligning unit 3 moves the front of the vehicle V right or left to a predetermined position while forcing the front wheels FW of the vehicle V in the right or left direction B or C according to the operation of a first actuator 11.

The rear aligning unit 5 is respectively installed at the bottom surface of the vehicle inspection line 9 while corresponding to both rear wheels RW of the vehicle V, and moves the rear of the vehicle V right or left to a predetermined position while forcing the rear wheels RW of the vehicle V in the right or left direction B or C according to the operation of a second actuator 13.

In particular, the predetermined position means a target position that is predetermined for the correct inspection with various equipment for the vehicle V having entered the vehicle inspection line 9, and the predetermined position may be changed according to information of the vehicle V input to the controller 7.

The controller 7 is installed on the vehicle inspection line 9 to control the operation of the first and second actuators 11 and 13.

In this case, the controller 7 may be a PLC (Programmable Logic Controller). In particular, the PLC 7 has a configuration of a general known technology which is widely known in the corresponding industrial field, so a detailed description thereof will be omitted.

The position aligning apparatus 1 of the vehicle according to an exemplary embodiment of the present invention may correctly align the vehicle V on the vehicle inspection line 9 for the inspection at the predetermined target position through the front aligning units 3 and rear aligning units 5 installed at the bottom surface of the vehicle inspection line 9.

Accordingly, the position aligning apparatus 1 of the vehicle according to an exemplary embodiment of the present invention may facilitate correct and seamless inspection of the vehicle V through the set various equipment.

Next, the front aligning unit 3 will be described in detail.

Figure 2:
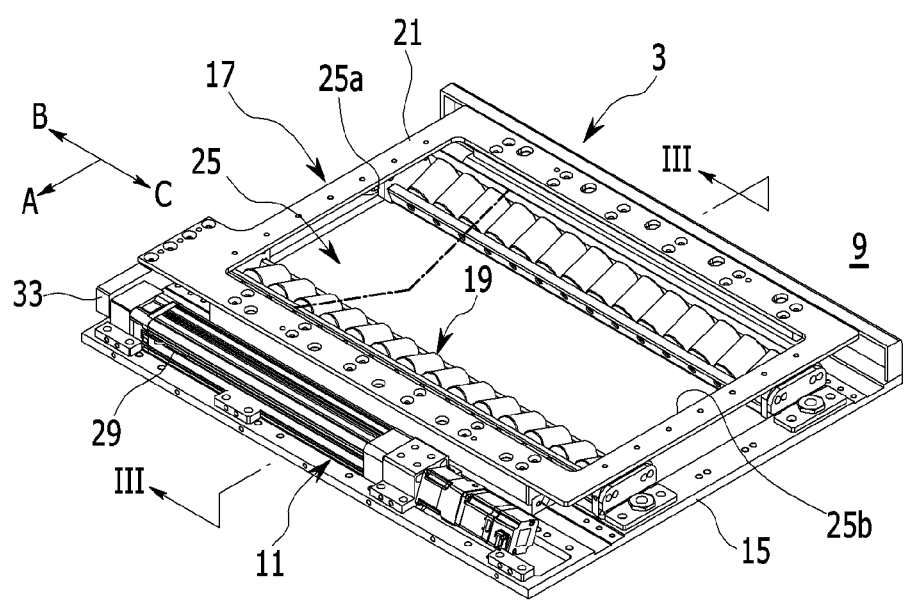
FIG. 2 is a perspective view of a front aligning unit applied to a position aligning apparatus of a vehicle according to an exemplary embodiment of the present invention.
Figure 3:
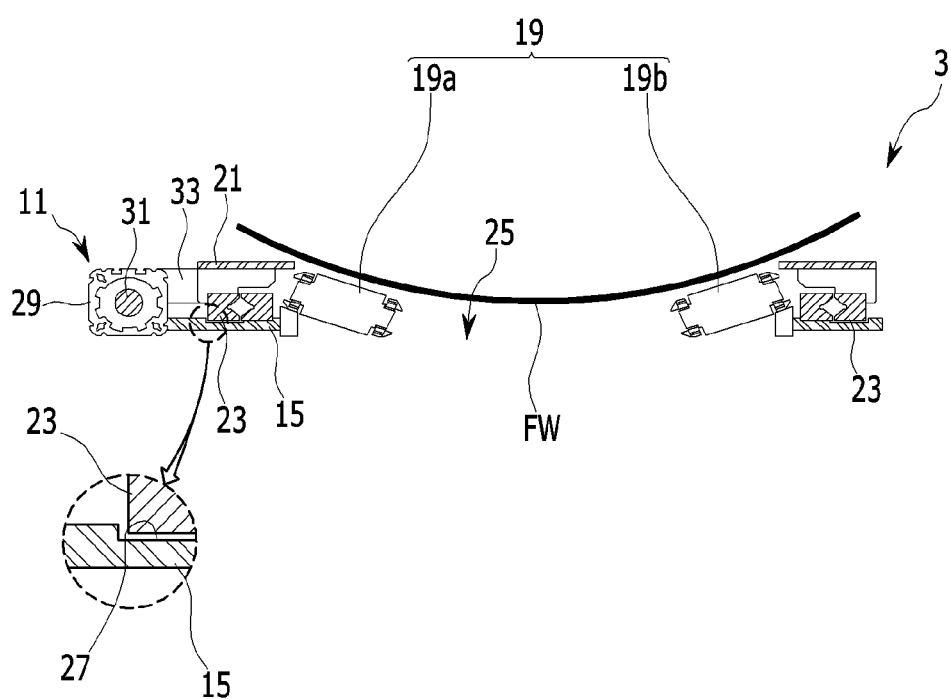
FIG. 3 is a cross-sectional view according to an exemplary embodiment of the present invention taken along line III-III of FIG. 2.

FIG. 2 is a perspective view of a front aligning unit applied to a position aligning apparatus of a vehicle according to an exemplary embodiment of the present invention, and FIG. 3 is a cross-sectional view according to an exemplary embodiment of the present invention taken along a line III-III of FIG. 2.

Referring to FIGS. 2 3, the front aligning unit 3 includes a base frame 15, a slide unit 17, and a sliding member 19.

The base frame 15 is installed at the bottom surface of the vehicle inspection line 9.

The slide unit 17 is installed to be movable in the right/left directions B and C of the vehicle V on the base frame 15, and is connected to the first actuator 11 to align the front of the vehicle V to the right/left position while selectively forcing the front wheels FW of the vehicle V in the right or left direction B or C. In particular, the slide unit 17 includes a slider 21 and a guide rail 23.

The slider 21 is installed to be movable in the right/left directions B and C of the vehicle V on the base frame 15, and an opening 25 for the front wheel FW of the vehicle V is formed.

Also, the slider 21 moves the outside and the inside of the front wheel FW according to the operation of the first actuator 11 while selectively pressing one side 25a and the other side 25b of the opening 25.

The guide rail 23 is respectively provided at the front/rear lower side of the slider 21, and is guided according to a guide groove 27 formed according to the moving direction of the slider 21 in the base frame 15.

Accordingly, the slider 21 may be moved in the right/left directions B and C while the guide rail 23 is guided along the guide groove 27 on the base frame 15.

On the other hand, the sliding member 19 is installed in plural (i.e., a plurality of the sliding members 19) along the moving direction of the left and right B and C of the slide unit 17 on the base frame 15, and contacts the front wheel FW of the vehicle V having entered the slide unit 17.

The sliding member 19 may be made of a pair of first free rollers 19a and 19b facing each other.

The first free rollers 19a and 19b are installed along the direction that the slider 21 is moved on the base frame 15, and are disposed at the opening 25 of the slider 21.

In this case, the first free rollers 19a and 19b may be respectively installed with one side declined toward a center of the opening 25. In particular, they may be formed with a "V" shape toward the center of the opening 25.

Accordingly, a pair of first free rollers 19a and 19b enter the opening 25 of the slider 21 and may simultaneously regulate the movement of the front of the vehicle V while supporting the exterior circumference of the front wheel FW when the front wheel FW of the vehicle V that has entered into the vehicle inspection line 9 enters the front aligning unit 3.

Also, the first free rollers 19a and 19b may guide the movement of the directions B and C of the front wheel FW when one side 25a and the other side 25b of the opening 25 of the slider 21 press one side and the other side of the front wheel FW of the vehicle V.

The first actuator 11 is made of an electric cylinder 29 and is installed to be disposed at one side of the slider 21 on the base frame 15, and an operation rod 31 is connected to the slider 21 through a connecting portion 33 to move the slider 21 in the right/left directions B and C.

The first actuator 11 is connected to the controller 7, and may be used while controlling a stroke amount according to a size or a kind of the vehicle V by an order of the controller 7.

Next, the rear aligning unit 5 will be described in detail.

Figure 4:
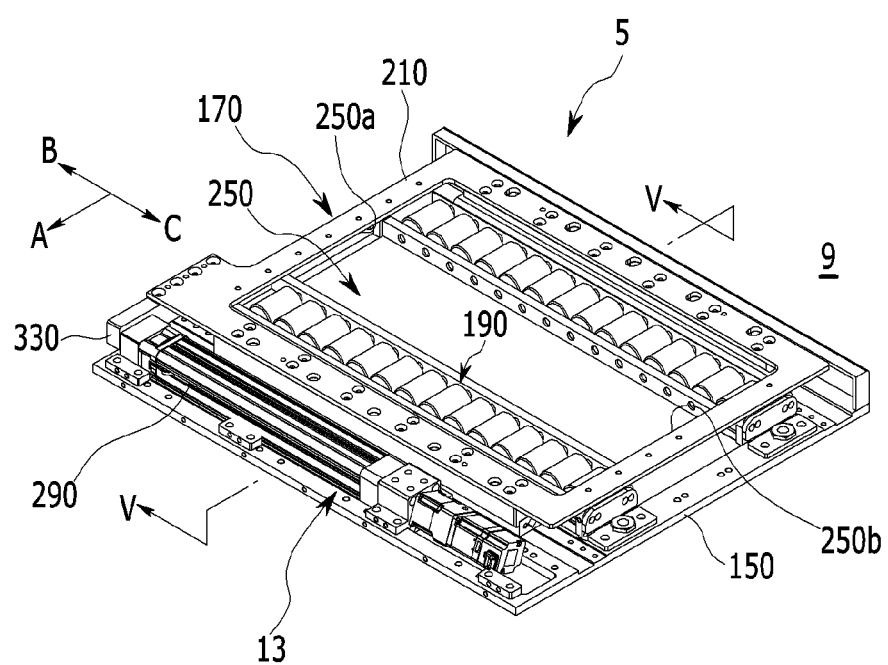
FIG. 4 is a perspective view of a rear aligning unit applied with a position aligning apparatus of a vehicle according to an exemplary embodiment of the present invention.
Figure 5:
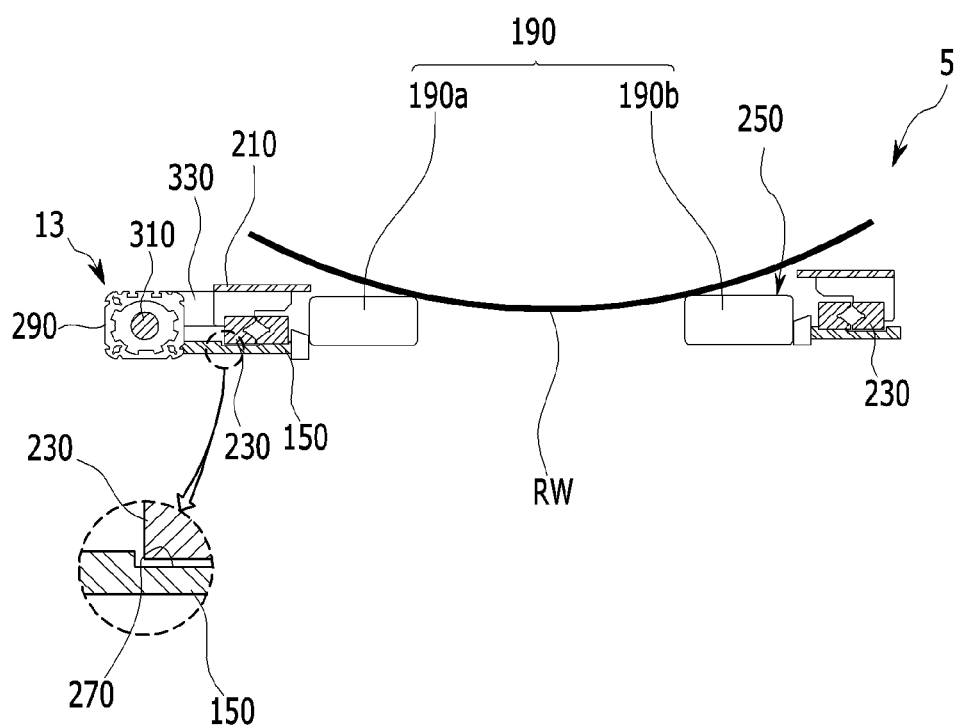
FIG. 5 is a cross-sectional view taken along line V-V of FIG. 4 according to an exemplary embodiment of the present invention.

FIG. 4 is a perspective view of a rear aligning unit applied with a position aligning apparatus of a vehicle according to an exemplary embodiment of the present invention, and FIG. 5 is a cross-sectional view taken along line V-V of FIG. 4 according to an exemplary embodiment of the present invention.

Referring to FIGS. 4 and 5, the rear aligning unit 5 includes a base frame 150, a slide unit 170, and a sliding member 190.

The base frame 150 is installed at the bottom surface on the vehicle inspection line 9.

The slide unit 170 is installed to be movable in the right/left directions B and C of the vehicle V on the base frame 15, and is connected to the second actuator 13 to align the front of the vehicle V to the right/left position while selectively pressing the front wheel FW of the vehicle V. In particular, the slide unit 170 includes a slider 210 and a guide rail 230.

The slider 210 is installed to be movable in the right/left directions B and C of the vehicle V on the base frame 15, and an opening 250 for the rear wheel RW of the vehicle V is formed.

Also, the slider 210 moves the outside and the inside of the rear wheel RW according to the operation of the second actuator 13 while selectively pressing one side 250a and the other side 250b of the opening 250.

The guide rail 230 is respectively provided at the front/rear lower side of the slider 210, and is guided according to a guide groove 270 formed according to the moving direction of the slider 210 in the base frame 150.

Accordingly, the slider 210 may be moved in the right/left directions B and C while the guide rail 230 is guided along with the guide groove 270 on the base frame 150.

On the other hand, the sliding member 190 is installed (preferably, a plurality of the sliding members 190) along the moving direction of the left and the right B and C of the slide unit 170 on the base frame 150, and contacts the rear wheel RW of the vehicle V having entered the slide unit 170.

The sliding member 190 may be made of a pair of first free rollers 190a and 190b facing each other.

The first free rollers 190a and 190b are installed along the direction that the slider 210 is moved on the base frame 150, and are disposed at the opening 250 of the slider 210.

In this case, the second free rollers 190a and 190b may be installed for one side to coaxially face each other while being oriented toward the center of the opening 250, differently from the first free rollers 19a and 19b.

Accordingly, a pair of second free rollers 190a and 190b enters the opening 250 of the slider 210 and simultaneously contacts the exterior circumference of the rear wheel RW when the rear wheel RW of the vehicle V that has entered into the vehicle inspection line 9 enters the rear aligning unit 5.

Also, the first free rollers 190a and 190b may guide the movement of the directions B and C of the rear wheel RW when one side 250a and the other side 250b of the opening 250 of the slider 210 press one side and the other side of the rear wheel RW of the vehicle V.

The second actuator 13 is made of an electric cylinder 290 and is installed to be disposed at one side of the slider 210 on the base frame 150, and an operation rod 310 is connected to the slider 210 through a connecting portion 330 to move the slider 210 in the right/left directions B and C.

The second actuator 13 is connected to the controller 7, and may be used while controlling the stroke amount according to the size or the kind of the vehicle V by an order of the controller 7.

Next, the operation of the position aligning apparatus 1 of the vehicle having the above configuration will be described with reference to FIGS. 6 and 7.

Figure 6:
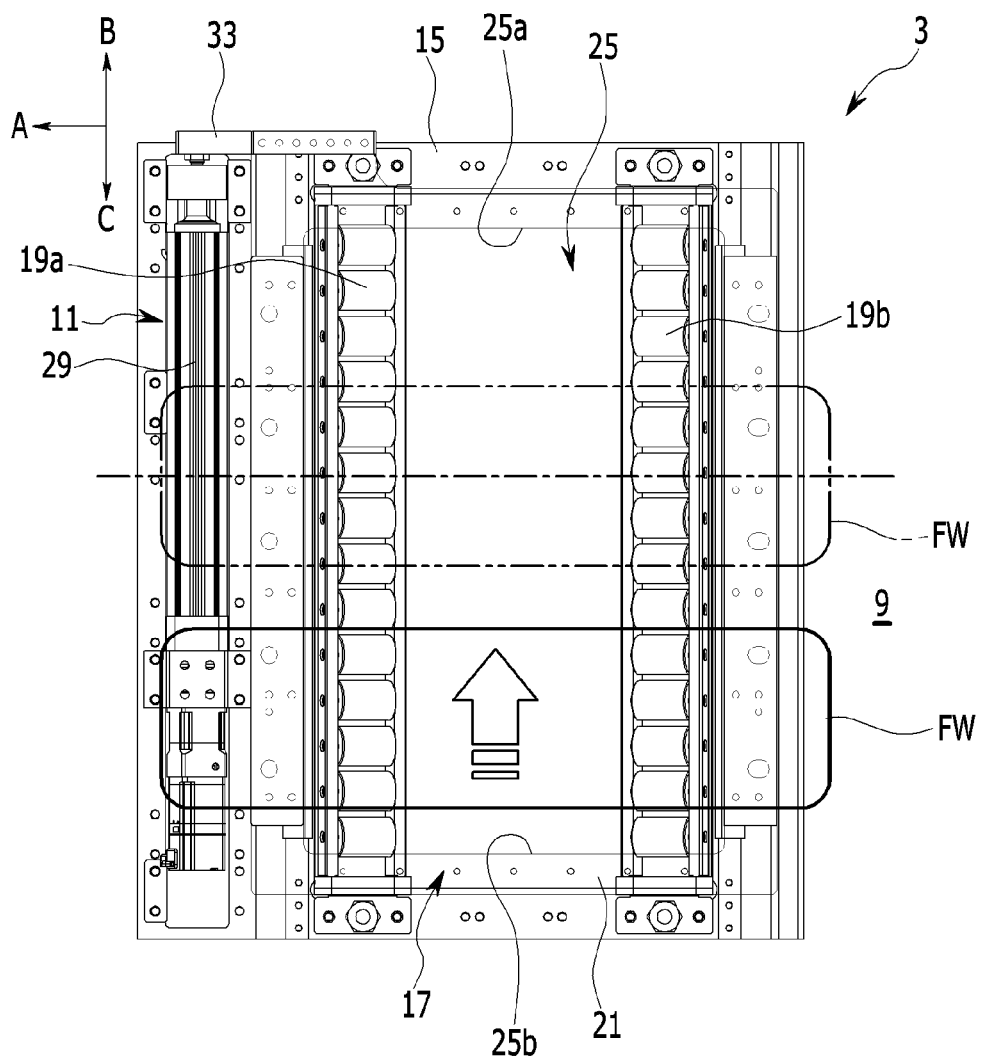
FIG. 6 and FIG. 7 are operation views of a position aligning apparatus of a vehicle according to an exemplary embodiment of the present invention.
Figure 7:
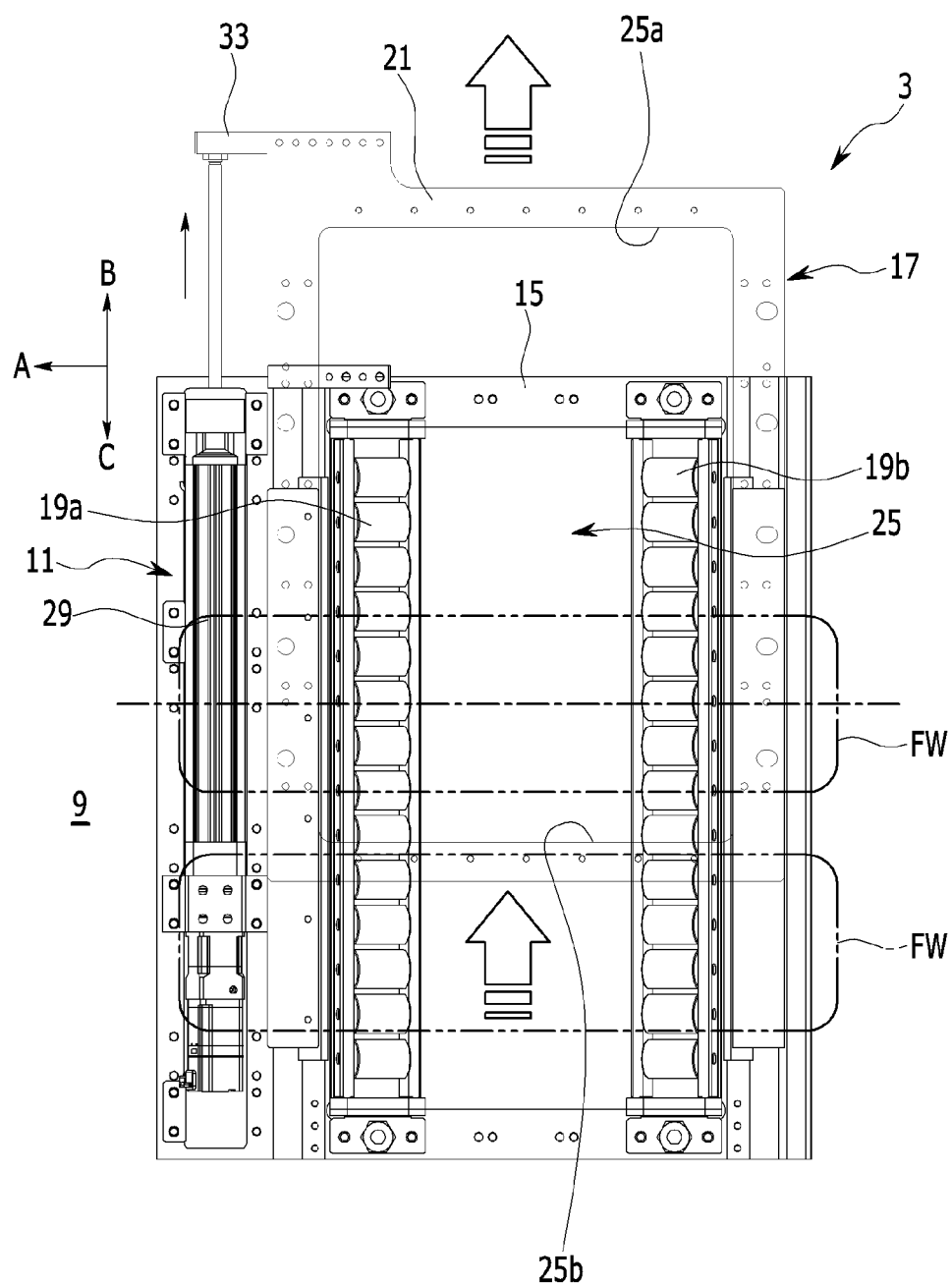

FIGS. 6 and 7 are operation views of a position aligning apparatus of a vehicle according to an exemplary embodiment of the present invention.

In the description of the operation of the position aligning apparatus 1 of the vehicle according to an exemplary embodiment of the present invention, because the configuration and the operation of the front aligning unit 3 are the same as those of the rear aligning unit 5, the operation of the front aligning unit 3 will be described and the description for the rear aligning unit 5 is simplified.

First, referring to FIG. 6, if the front wheel FW of the vehicle V enters the front aligning unit 3, the controller 7 operates the first actuator 11.

In this case, the controller 7 operates the first actuator 11 while controlling the stroke amount according to the size and the kind of the vehicle V.

Next, referring to FIG. 7, while the slider 21 connected to the operation rod 31 goes straight together according to the operation of the first actuator 11, one side of the front wheel FW is pressed and simultaneously moved to one side 25a of the opening 25.

While the moved front wheel FW is sliding-contacted with the first free rollers 19a and 19b, it is smoothly moved to the one side, so the front of the vehicle V may be aligned at the target position for the inspection.

Also, while the rear aligning unit 5 is operated along with the front aligning unit 3 to move the rear wheel RW of the vehicle, the rear of the vehicle V having entered the vehicle inspection line 9 is aligned at the target position for the inspection.

Accordingly, the vehicle V having entered the vehicle inspection line 9 may be aligned at the target position for the inspection while the front and the rear are respectively moved by the front aligning unit 3 and the rear aligning unit 5, thereby the correct and seamless inspection work may be performed.

Also, as the position aligning apparatus 1 of the vehicle according to an exemplary embodiment of the present invention is directly installed at the bottom surface of the vehicle inspection line 9, the work of digging the ground in the conventional art may be omitted, and the work time according to the installation of the equipment may be reduced.

Also, by omitting the digging work, the position and the place for the installation of the position aligning apparatus 1 of the vehicle are flexible, and the work according to the replacement and the removal of the position aligning apparatus 1 of the vehicle may be easily performed.

Hereafter, an inspection method of the vehicle using the above position aligning apparatus 1 of the vehicle according to an exemplary embodiment of the present invention will be described with reference to accompanying drawings as well as the above-described drawings.

Figure 8:
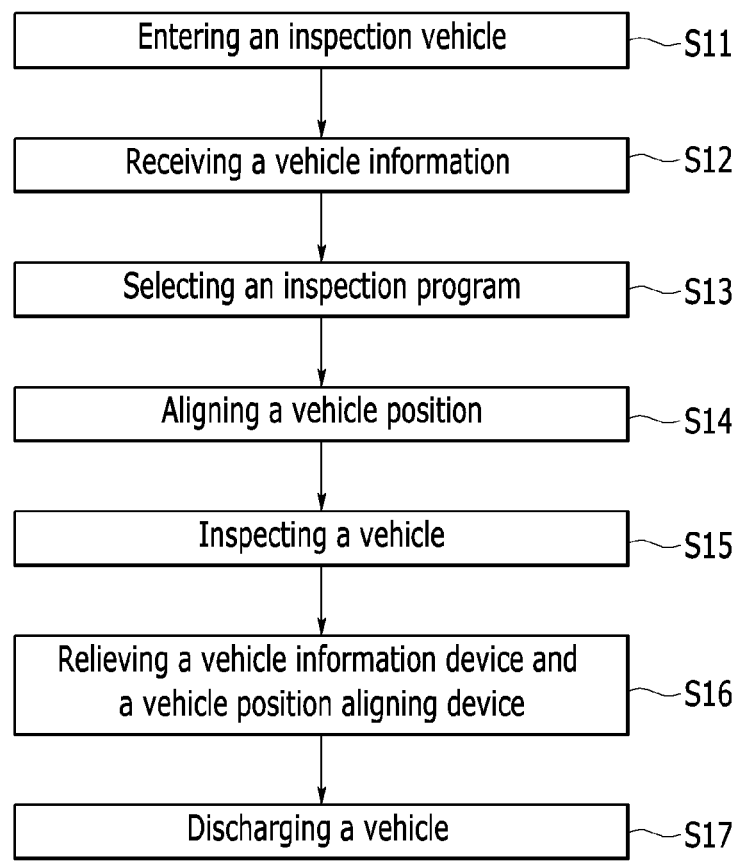
FIG. 8 is a flowchart explaining an inspection method of a vehicle according to an exemplary embodiment of the present invention.

FIG. 8 is a flowchart explaining an inspection method of a vehicle according to an exemplary embodiment of the present invention.

Referring to FIG. 8 as well as FIG. 1 to FIG. 7, first, in an exemplary embodiment of the present invention, the vehicle V that has undergone a design process enters the vehicle inspection line 9 for the vehicle inspection (S11).

In an exemplary embodiment of the present invention, the vehicle V is then connected to a vehicle information device stored with the information such as the kind and the size of the vehicle through a worker, and vehicle information is received (S12).

Then, in an exemplary embodiment of the present invention, the inspection program to be used is selected according to the information obtained in the process of receiving the information of the vehicle V (S13)

In an exemplary embodiment of the present invention, to perform the inspection according to the selected program, the position of the vehicle V is then target-positioned at the inspection position (S14).

In particular, in the target positioning (S14) of the vehicle V, the position aligning apparatus 1 of the vehicle including the front aligning unit 3 regulating the front movement of the vehicle V having entered into the vehicle inspection line 9 and varying the right/left position of the front of the vehicle V while pressing the front wheel FW of the vehicle V in the right/left directions B and C according to the operation of the first actuator 11 may be provided.

Also, the position aligning apparatus 1 of the vehicle includes the rear aligning unit 5 varying the right/left position of the rear of the vehicle V while pressing the rear wheel RW of the vehicle V in the right/left directions B and C according to the operation of the second actuator 13 and the controller 7 controlling the operation of the first and second actuators 11 and 13 (referring to FIG. 1 to FIG. 5).

In this case, the position aligning apparatus 1 of the vehicle aligns the front right/left position of the front of the vehicle V while the slider 21 of the front aligning unit 3 selectively presses the outside and the inside of the front wheel FW of the vehicle V (referring to FIG. 6 and FIG. 7).

Also, the slider 210 of the rear aligning unit 5 aligns the right/left position of the rear of the vehicle V while selectively pressing the outside and the inside of the rear wheel of the vehicle V.

Accordingly, the vehicle V having entered the vehicle inspection line 9 is aligned at the target position for the inspection.

Next, in an exemplary embodiment of the present invention, the vehicle V that is target-positioned at the inspection position undergoes the inspection such as regarding the assembly state, the appearance, and the gap step through the inspection program (S15).

Subsequently, in an exemplary embodiment of the present invention, if the inspection process is completed, the vehicle information device is separated and the operation of the position aligning apparatus 1 of the vehicle is relieved. (S16).

Finally, in an exemplary embodiment of the present invention, the vehicle V of which the inspection process is finished and the position aligning apparatus of the vehicle is relieved is discharged outside the vehicle inspection line 9 by the worker (S17).

According to the inspection method of the vehicle including the series of steps according to an exemplary embodiment of the present invention, the position of the vehicle V having entered the vehicle inspection line 9 is moved into the predetermined target position for the front aligning unit 3 and the rear aligning unit 5 by the operation of the controller 7 for performing the inspection, thereby performing the further correct and seamless inspection work.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A position aligning apparatus of a vehicle installed at a bottom surface of a vehicle inspection line to respectively correspond to both sides of a front wheel and both sides of a rear wheel of the vehicle having entered into the vehicle inspection line to target-position the vehicle at an inspection position, comprising:
    a front aligning unit regulating a front movement of the vehicle having entered into the vehicle inspection line and aligning a front right/left position of the vehicle to a predetermined position while pressing the front wheel of the vehicle in a right/left direction according to operation of a first actuator;

a rear aligning unit aligning a rear right/left position of the vehicle to a predetermined position while pressing the rear wheel of the vehicle in the right/left direction according to operation of a second actuator; and a controller controlling the operation of the first and second actuators, wherein the front aligning unit includes:

a base frame installed at the bottom surface of the vehicle inspection line;

a slide unit installed to be movable in the right/left direction of the vehicle on the base frame and connected to the first actuator to align the front right/left position of the vehicle while selectively pressing an outside and an inside of the front wheel of the vehicle; and a plurality of sliding members installed along a moving direction of the slide unit on the base frame and contacting the front wheel of the vehicle having entered the slide unit, wherein the slide unit includes:

a slider installed to be movable on the base frame, formed with an opening entered by the front wheel of the vehicle, and moving the outside and the inside of the front wheel according to the operation of the first actuator while selectively pressing one side and the other side of the opening; and a guide rail provided at the front/rear lower side of the slider and guided along a guide groove formed along the moving direction of the slider at the base frame.

2. The position aligning apparatus of the vehicle of claim 1, wherein the sliding member is made of a plurality of first free rollers installed on the base frame to be disposed at the opening of the slider and installed as a pair facing each other to contact the front wheel.

3. The position aligning apparatus of the vehicle of claim 2, wherein a pair of first free rollers includes one side that is respectively declined toward a center of the opening.

4. The position aligning apparatus of the vehicle of claim 1, wherein the first actuator is installed at one side of the slider on the base frame and is made of an electric cylinder having an operation rod connected to the slider through a connecting portion to move the slider to a right/left side.

5. The position aligning apparatus of the vehicle of claim 1, wherein the rear aligning unit includes:

a second base frame installed at a bottom surface of the vehicle inspection line;

a second slide unit installed to be movable in the right/left direction of the vehicle on the second base frame and connected to the second actuator to align the right/left position of the vehicle while selectively pressing the outside and the inside of the rear wheel of the vehicle; and a plurality of second sliding members installed along the moving direction of the second slide unit on the second base frame and contacting the rear wheel of the vehicle having entered the second slide unit.

6. The position aligning apparatus of the vehicle of claim 5, wherein the second slide unit includes:

a second slider installed to be movable on the second base frame, formed with an opening entered by the rear wheel of the vehicle, and moving the inside and the outside of the rear wheel according to the operation of the second actuator while selectively pressing one side and the other side of the opening; and a second guide rail provided at the front/rear lower side of the second slider and guided along a guide groove formed along the moving direction of the second slider at the second base frame.

7. The position aligning apparatus of claim 6, wherein the second sliding member is made of a plurality of second free rollers installed on the base frame to be disposed at the opening of the second slider and installed in a pair facing each other to contact the rear wheel.

8. The position aligning apparatus of the vehicle of claim 6, wherein the second actuator is installed at one side of the second slider on the second base frame and is made of an electric cylinder having an operation rod connected to the second slider through a connecting portion to move the second slider to a right/left side.

9. A position aligning apparatus of a vehicle, comprising:

a base frame installed at a bottom surface of a vehicle inspection line;

a slide unit installed to be moveable in a right/left direction of the vehicle on the base frame and moving the position of the vehicle in the right/left direction while selectively pressing an outside and an inside of a vehicle wheel of the vehicle;

a plurality of sliding members installed along a moving direction of the slide unit on the base frame and sliding-contacted with the vehicle wheel of the vehicle having entered the slide unit; and an actuator installed on the base frame to move the slide unit in the right/left direction, wherein the position aligning apparatus is installed to correspond to the vehicle wheel of the vehicle having entered at the bottom surface of the vehicle inspection line to target-position the vehicle at an inspection position, and the slide unit includes:

a slider installed to be movable on the base frame, formed with an opening entered by the front wheel of the vehicle, and moving the outside and the inside of the front wheel according to the operation of the first actuator while selectively pressing one side and the other side of the opening; and a guide rail provided at the front/rear lower side of the slider and guided along a guide groove formed along the moving direction of the slider at the base frame.

10. The position aligning apparatus of the vehicle of claim 9, wherein the sliding member is made of a plurality of first free rollers installed on the base frame to be disposed at the opening of the slider and installed as a pair facing each other to contact the vehicle wheel of the vehicle.

11. The position aligning apparatus of the vehicle of claim 10, wherein a pair of first free rollers include one side that is respectively declined toward a center of the opening.

12. The position aligning apparatus of the vehicle of claim 9, wherein the actuator is installed at one side of the slider on the base frame and is made of an electric cylinder having an operation rod connected to the slider through a connecting portion to move the slider in a right/left direction.

13. An inspection method of a vehicle, comprising:
(a) entering an inspection vehicle into a vehicle inspection line;
(b) connecting a vehicle information device to the vehicle and receiving vehicle information;
(c) selecting an inspection program according to the information obtained from the information receiving process;

(d) target-positioning the vehicle to an inspection position to perform the inspection according to the selected program;
(e) inspecting the vehicle through the inspection program if the vehicle is positioned at the target position;
(f) separating the vehicle information device if the inspection process is completed and relieving the operation of the position aligning apparatus of the vehicle; and
(g) discharging the vehicle outside the vehicle inspection line, wherein in the process (d):

a position aligning apparatus of the vehicle includes:

a front aligning unit regulating a front movement of the vehicle having entered into the vehicle inspection line and aligning a front right/left position of the vehicle to a predetermined position while pressing a front wheel of the vehicle in a right/left direction according to operation of a first actuator, wherein a slider of the front aligning unit aligns the right and left position of the vehicle while selectively pressing an outside or an inside of the front wheel of the vehicle;

a rear aligning unit aligning a rear right/left position of the vehicle to a predetermined position while pressing a rear wheel of the vehicle in the right/left direction according to operation of a second actuator, wherein a second slider of the rear aligning unit aligns the right and left position of the vehicle while selectively pressing the outside or the inside of the rear wheel of the vehicle; and a controller controlling the operation of the first and second actuators.

* * * * *